UNITED STATES PATENT OFFICE.

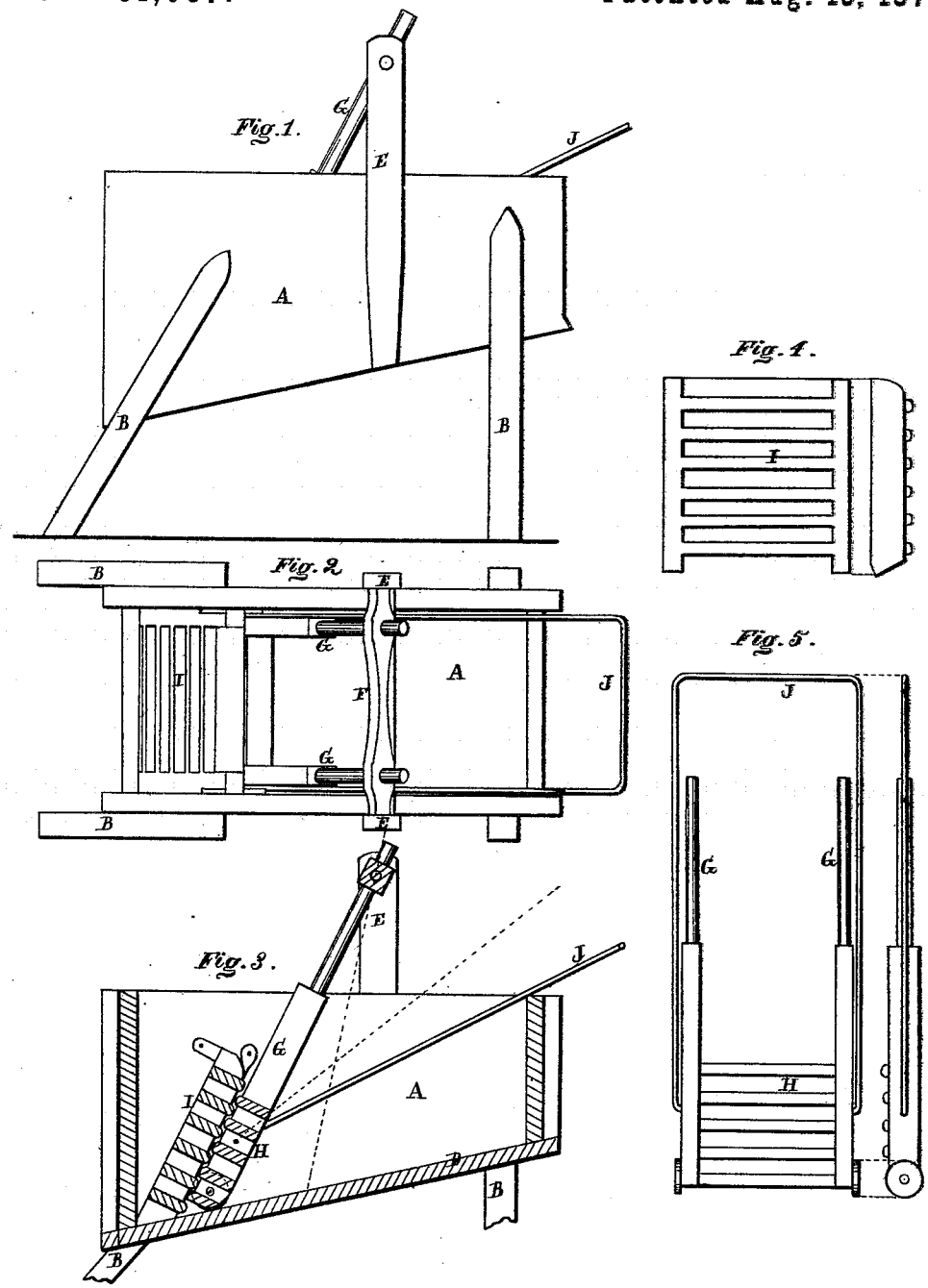

GEORGE W. MARLATT, OF RICHFIELD, OHIO.

IMPROVEMENT IN WASHING-MACHINES.

Specification forming part of Letters Patent No. 181,087, dated August 15, 1876; application filed March 7, 1876.

*To all whom it may concern:*

Be it known that I, GEORGE W. MARLATT, of Richfield, in the county of Summit and State of Ohio, have invented a certain new and Improved Washing-Machine; and I do hereby declare that the following is a full, clear, and complete description thereof, reference being had to the accompanying drawings, making a part of the same.

Figure 1 is a side view of the machine. Fig. 2 is a plan view. Fig. 3 is a vertical section. Figs. 4 and 5 are detached sections.

Like letters of reference refer to like parts in the several views.

A is the wash-box, mounted upon the legs B. One end of the box is made much deeper than the other; hence the bottom D thereof is an inclined plane, as will be seen in Fig. 3. On each side of the box is secured a standard, E, in the upper ends of which is journaled a shaft, F, Fig. 2. Through said shaft passes the arms G of a beater, consisting of said arms G and series of bars H, secured in the lower ends thereof. A detached view of the beater is shown in Fig. 5. At the deepest end of the box is secured a series of bars, forming a grate, I, which is arranged in an oblique position, as will be seen in Fig. 3. A detached view of the same is shown in Fig. 4.

The practical operation of the machine is as follows: A proper amount of water is thrown into the wash-box. The clothes are placed in the box between the beater and the grate. The beater is drawn back for that purpose by the handle J. The clothes are washed by means of the beater, which is repeatedly forced against them with more or less violence by the operator by means of the handle J. This action of the beater upon the clothes drives them against the grate, and at the same time compresses them, forcing the water therefrom through the grate and beater, but which immediately becomes again charged with water on drawing back the beater, to be again driven upon the clothes. By this operation of the beater the clothes are compressed, and the water forced out of them, thereby removing the dirt. By this means the clothes are easily and quickly washed, requiring a simple rinsing to prepare them for the wringer.

What I claim as my invention, and desire to secure by Letters Patent, is—

The combination of the grate I with the beater H, having the arms G, adapted to slide in the pivoted shaft F above the inclined box A, and operated by the handle J, as specified.

GEORGE W. MARLATT.

Witnesses:
J. H. BURRIDGE,
JOHN SCOTT.